TELEPHONE INTERCEPT SYSTEM

Filed May 1, 1957 7 Sheets-Sheet 1

INVENTOR.
ROBERT K. KAYE
BY [signature]
AGENT

Feb. 3, 1959 R. K. KAYE 2,872,528

TELEPHONE INTERCEPT SYSTEM

Filed May 1, 1957 7 Sheets-Sheet 3

Feb. 3, 1959 R. K. KAYE 2,872,528

TELEPHONE INTERCEPT SYSTEM

Filed May 1, 1957 7 Sheets-Sheet 4

Feb. 3, 1959 R. K. KAYE 2,872,528

TELEPHONE INTERCEPT SYSTEM

Filed May 1, 1957 7 Sheets-Sheet 5

INTERCEPT LINK I

INTERCEPT LINK I

Feb. 3, 1959 R. K. KAYE 2,872,528

TELEPHONE INTERCEPT SYSTEM

Filed May 1, 1957 7 Sheets-Sheet 7

United States Patent Office 2,872,528

Patented Feb. 3, 1959

2,872,528

TELEPHONE INTERCEPT SYSTEM

Robert K. Kaye, Rochester, N. Y., assignor to General Dynamics Corporation, Rochester, N. Y., a corporation of Delaware Application May 1, 1957, Serial No. 656,351

11 Claims. (Cl. 179—27)

Figure 1:
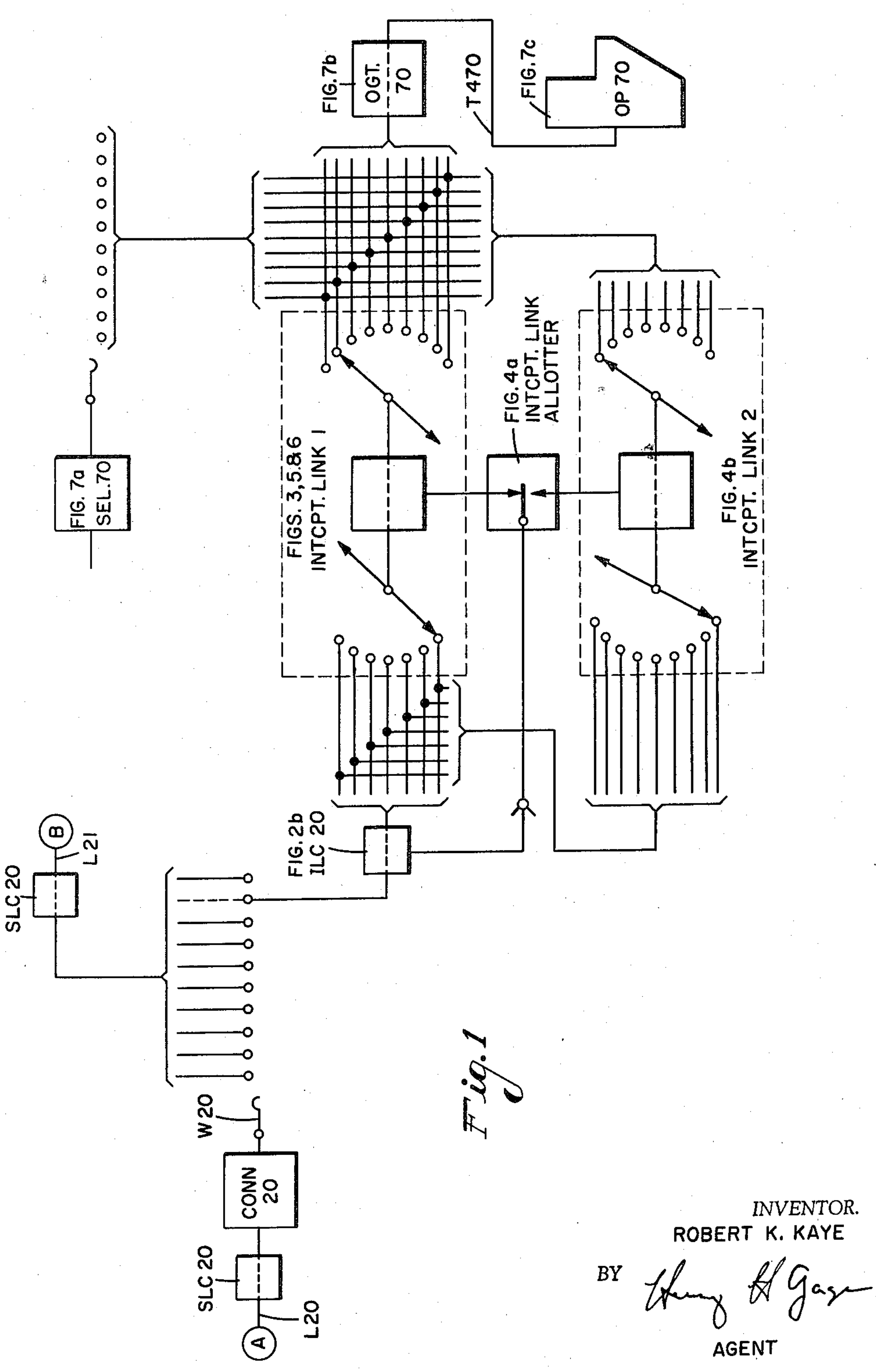

My invention relates to telephone systems in general and more particularly to apparatus used for intercepting telephone calls to particular ones of a group of subscriber lines.

It is the practice to provide a telephone office comprising a group of terminations for subscriber lines and switching equipment, where the switching equipment is operative for connecting calling and called ones of the lines. Owing to service requirements, it may be necessary from time to time to prevent calls from being extended over particular trunk groups or to certain ones of the lines or to particular subscriber stations on those lines. Upon an attempt to extend such a connection from a calling line, the call is generally diverted to an intercept or other operator position so that the user of the calling line may receive further instructions from the operator. Auxiliary line circuits are provided for terminating intercepted trunks or lines. It has been the practice to make lines so terminated accessible either directly or through a finder switch to a trunk line extending to an operator position. The trunk lines to the operator position are normally available to other switching equipment for extending different class of calls to the operator. With such an arrangement, it is necessary to associate the intercept equipment with only one of a group of operator trunk lines. In the event the one trunk line is busy in the course of extending one of the other class of connections to the operator position at the time intercept service is required, the extension of the intercept call must await the release of the trunk line.

Accordingly, it is an object of my invention to provide a new and improved intercept system.

Another object of my invention is to provide a new and improved link that is particularly adapted for use in intercept systems.

Another object of my invention is to provide a new and improved intercept system wherein calls from any one of a plurality of lines may be extended to an operator position over any idle one of a plurality of operator trunk lines.

Another object of my invention is to provide a new and improved switching link wherein switching time is reduced to a minimum.

Another object of my invention is to provide a system wherein more than one intercept call may be extended simultaneously to an operator position over any one of a number of identical intercept links.

I accomplish these and other objects by providing a telephone system comprising a group of lines terminated at an office which also includes conventional switching equipment, such as step-by-step dial controlled switches. The switching equipment is directly operative for establishing connections between calling and called lines. In the event certain ones of the lines are to receive intercept service, i. e., to be restricted against receiving incoming calls, an auxiliary line circuit is individually connected to each such intercepted line in parallel with the regular line circuit.

From the office a plurality of trunk lines extend to an operator position which may be located remote from the office. An intercept link having an incoming end comprising a finder and an outgoing end comprising a trunk selector is provided for diverting calls from the auxiliary line terminations to one of the trunk lines and the operator position. Accordingly, the finder has access to the intercepted calling lines through the auxiliary line terminations, while the trunk selector has access to any one of the trunk lines. Within each of the intercept line circuits, means operative in response to an incoming call condition on the corresponding one of the intercepted lines is effective for causing the finder to establish a connection between the called one of the lines and the incoming link end. Meanwhile the same means is effective for simultaneously causing the trunk selector to extend a connection from the outgoing link end to an idle one of the trunk lines. The link also includes connecting means operative upon the location of the proper intercept line and an idle one of the trunks for completing a connection between the incoming and outgoing link ends. This arrangement has the further advantage that a connection between an intercepted line and an idle one of the trunks is established in the length of time required for the simultaneous hunting operation of finder and selector rather than the time required for the finder and selector to hunt sequentially, the latter being an arrangement found in previously accepted link arrangements.

Figure 2A:
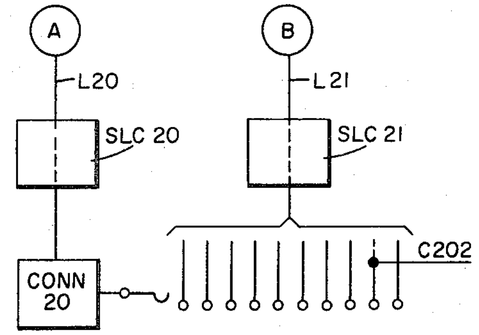
Figure 2B:
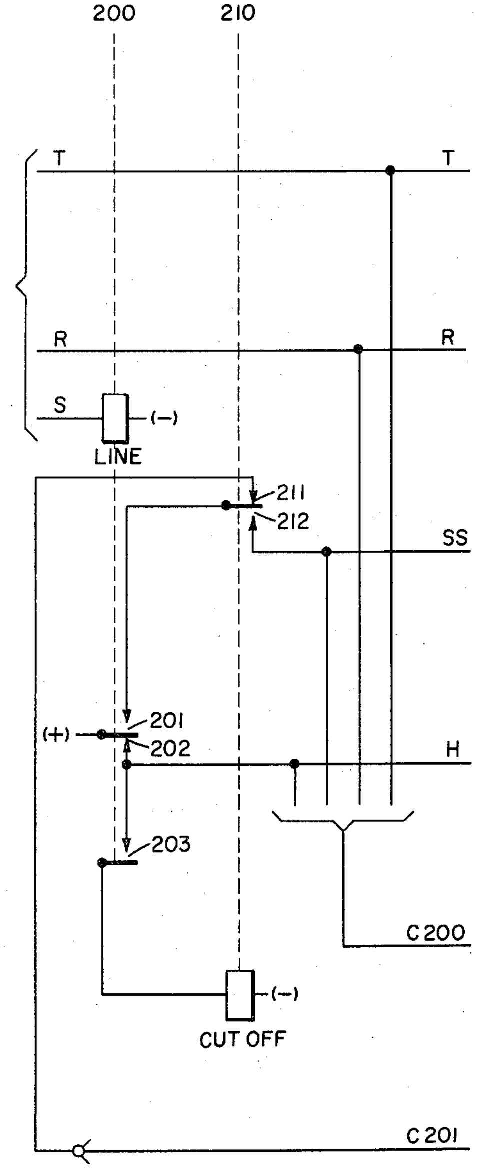
Figure 8:
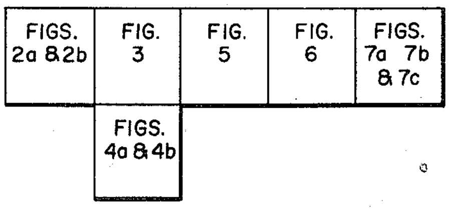
Figure 3:
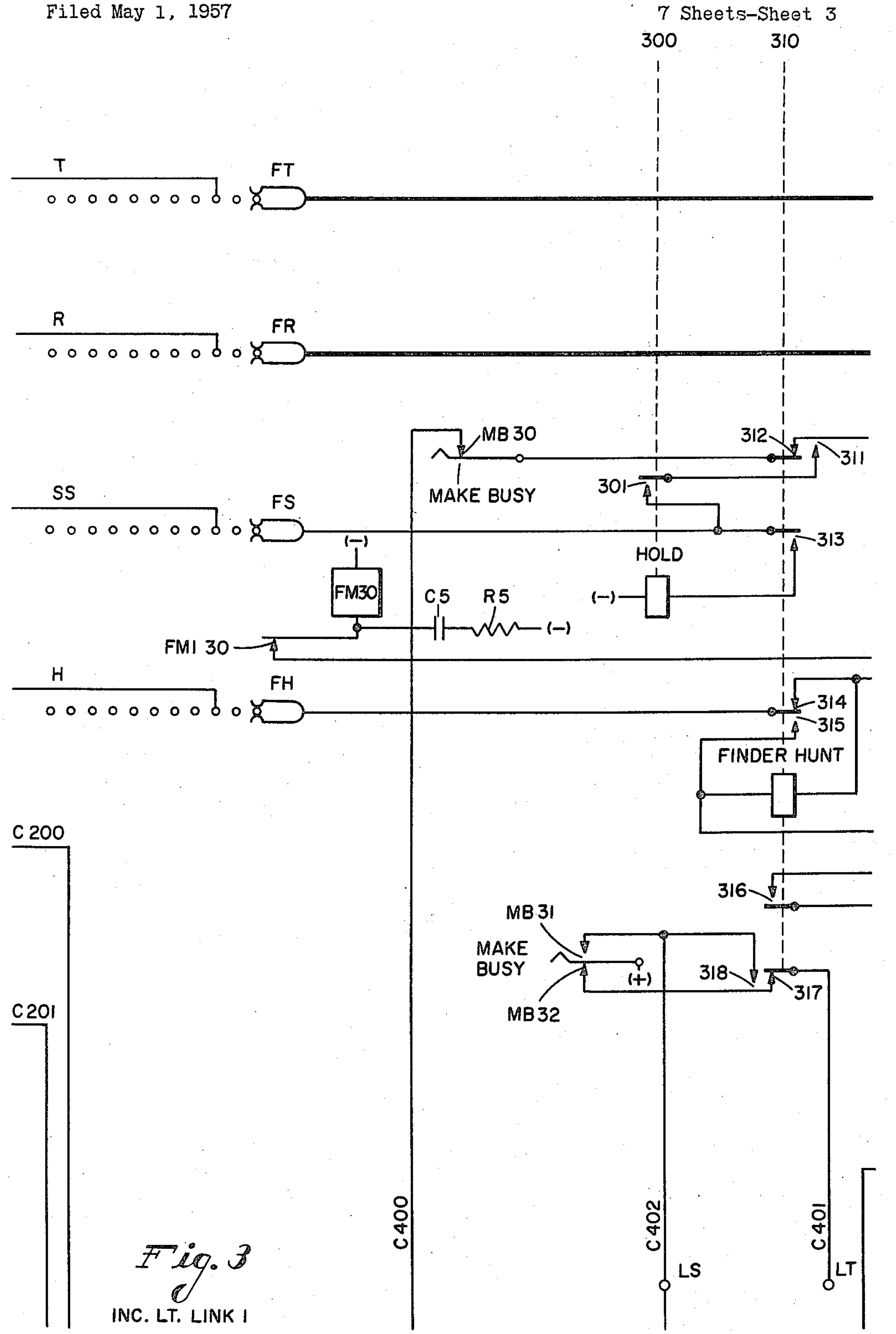
Figures 4A, 4B:
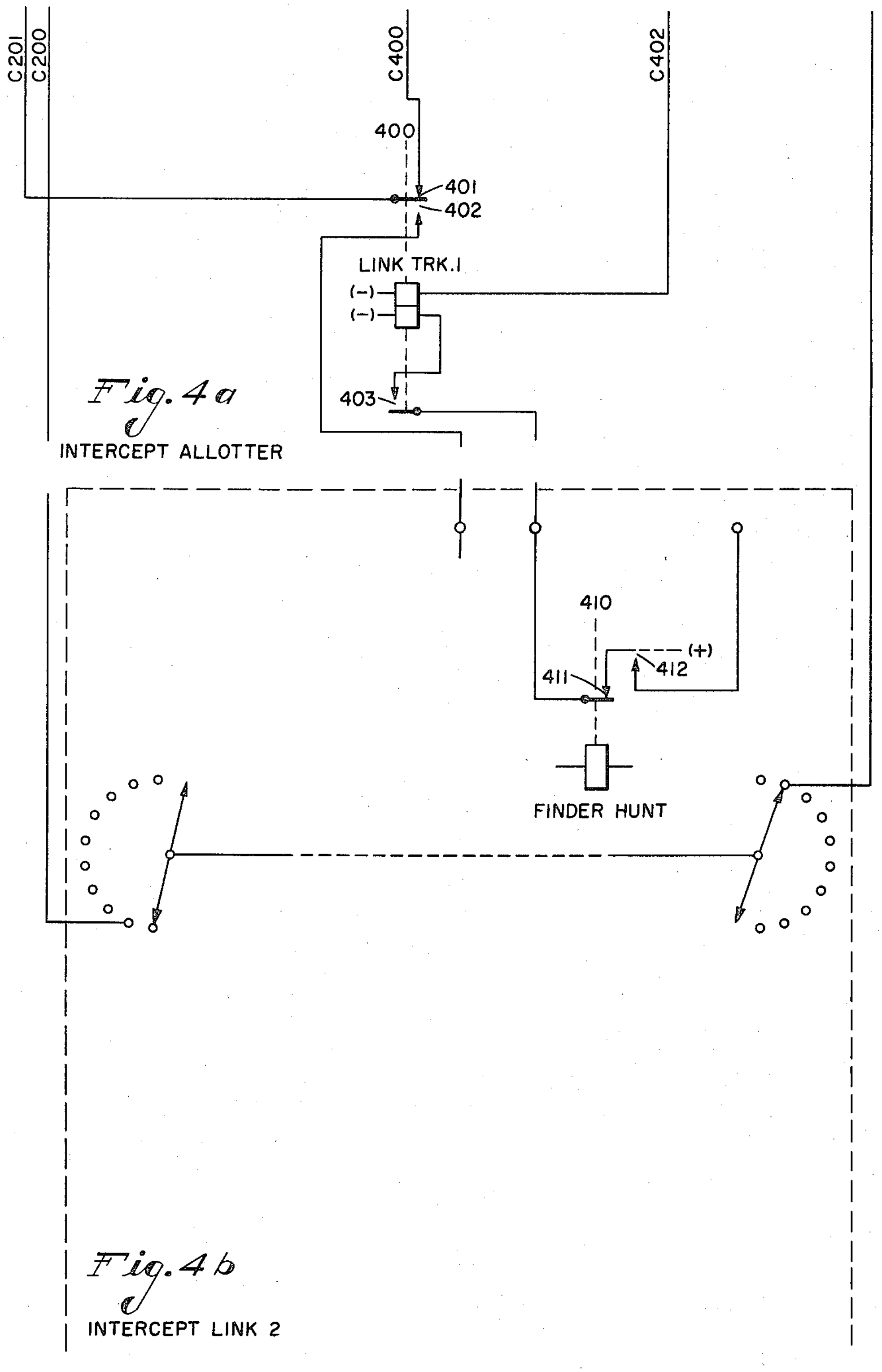
Figure 5:
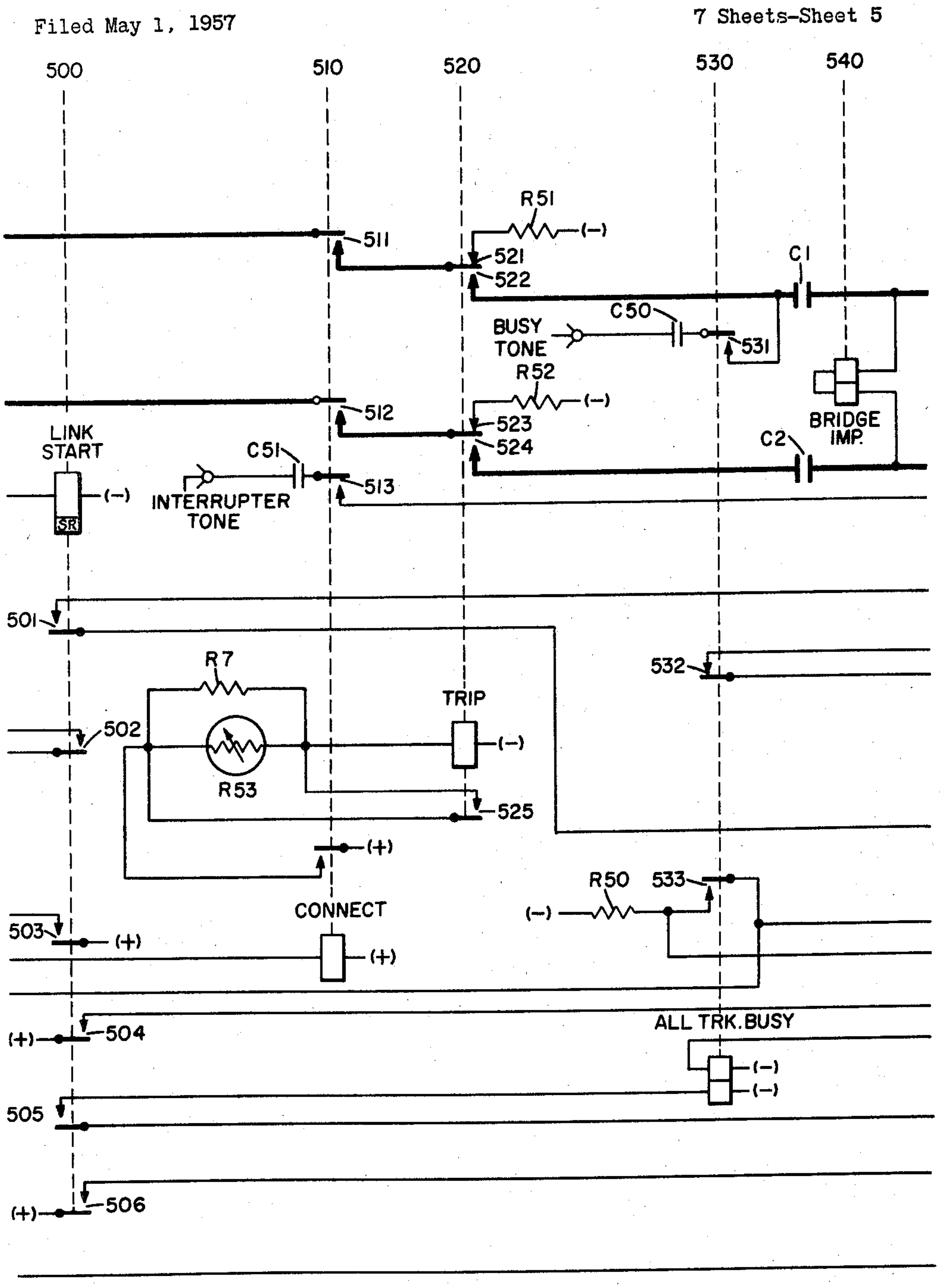
Figure 6:
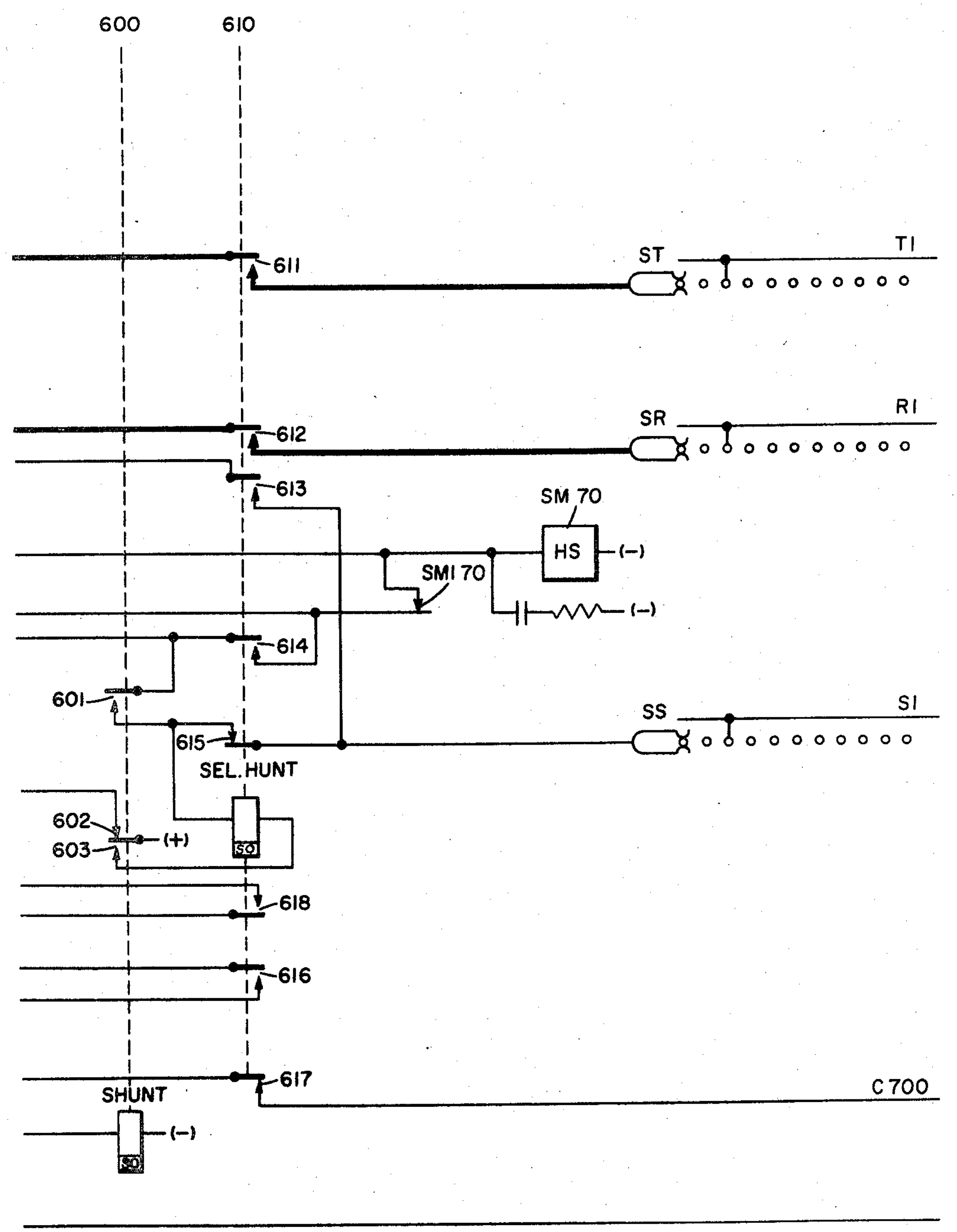
Figures 7A, 7B, 7C:
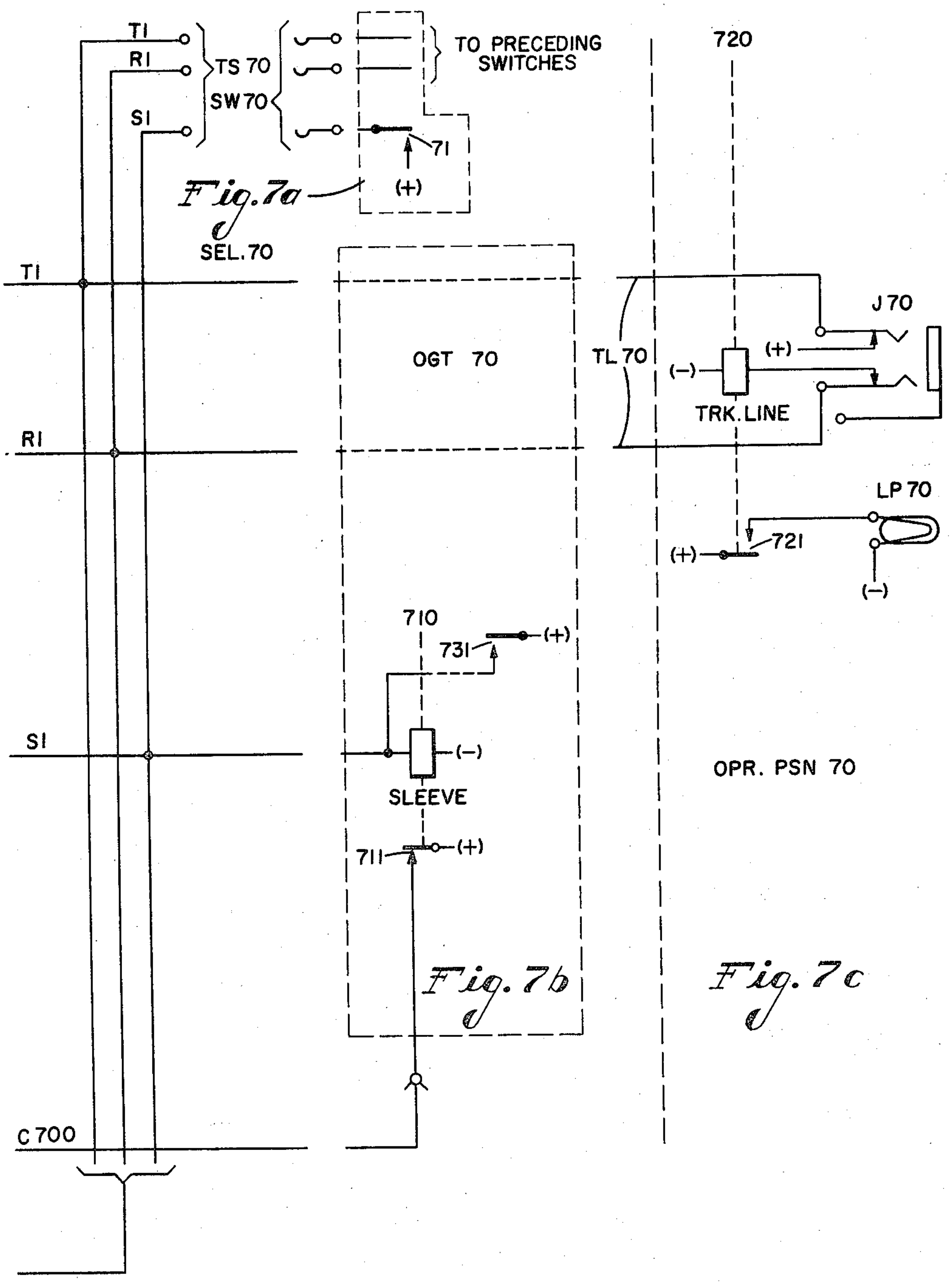

For a better understanding of my invention, reference is made in the following description to the drawings attached to and forming a part of the present specification, and in which:

Fig. 1 shows a block diagram of the system embodying my invention;

Figs. 2*a* and 2*b* show a block representation of central office switching apparatus and a schematic diagram of a line intercept circuit, respectively;

Figs. 3, 5 and 6 show a schematic diagram of a first intercept link;

Figs. 4*a* and 4*b* show a skeletonized diagram of a link allotter circuit and a block representation of a second intercept link, respectively;

Figs. 7*a*, 7*b* and 7*c* show a block diagram of a local selector, a skeletonized representation of an outgoing trunk circuit, an outgoing trunk line, and a block diagram of an operator position, respectively; and Fig. 8 shows the oder in which Figs. 2–7, inclusive, are to be assembled.

Power for the apparatus described in the following paragraphs is drawn from several common sources. The first is a source of direct current such as a battery, the most positive terminal or plate of which is grounded and hereinafter referred to in the description as "ground" and in the drawings as (+); the most negative, ungrounded terminal or plate is referred to in the description as "battery" and in the drawings as (—). Another power source is the ringing generator, such as a 20 cycle generator, having one side connected to ground, hereinafter referred to as "ground" in the description, the other, ungrounded side being referred to as "ringing generator." Another power source is the tone supply, such as a 400 cycle generator having grounded and ungrounded sides. When the ungrounded side is supplied in continuous form, it is referred to in the drawings and description as "intercept tone." When the ungrounded side is connected through a standard, telephone type 120 IPM interrupter, the tone is referred to in the drawings and description as "busy tone."

*General description of office switching equipment*

Referring to Figs. 1 and 2*a*, the contemplated system includes an office having a plurality of subscriber lines such as L20 and L21. The lines terminate in line circuits such as SLC20 and SLC21, respectively. Conventional switching equipment within the office such as step-by-step dial type apparatus, including connector CONN20, is effective for establishing connections between a calling and a called one of the lines. In this function the wipers of the CONN20 switch, shown collectively as W20, are effective to complete the connection by way of the multiple appearance of the called line. More fully stated, assuming that a call has been extended from a subscriber station such as A on line L20 through the switching equipment, and that wipers W20 of CONN20 have been advanced to engage the connector multiple terminals of the called line such as L21, conventional means within CONN20 thereafter applies ringing current to the talking (tip and ring) conductors of the called line, and ground to the third (sleeve) conductor of the called line circuit, in this case SLC21. Other conventional means within CONN20 is thereafter responsive to the transmission of an off-hook supervisory signal transmitted from called line station B for disconnecting the ringing current from the called line L21 and for completing a talking circuit between calling line L20 and called line L21.

*Seizure of an intercept line circuit*

In the event that calls to certain ones of the lines are to be intercepted (i. e., diverted from the called line to other apparatus), an auxiliary, intercept line circuit such as ILC20 is individually connected to the connector multiple terminals of each such line. More specifically, conductors T, R, and S, shown collectively as C202, extending to ILC20 are connected to the tip, ring and sleeve terminals and conductors of the intercepted subscriber line and line circuit at the connector bank multiple appearance. Under these conditions, when a call has been extended from a calling station such as A and CONN20 has been operated to advance wiper set W20 into engagement with the intercepted line connector multiple terminal set, ground applied to the sleeve conductor in the above described manner is also connected to conductor S, thereby completing an obvious operating circuit for line relay 200 within ILC20.

While the apparatus forming the preferred embodiment of my invention is suited for diverting or intercepting calls from particular subscriber lines, it will be obvious to those skilled in the art that calls extended through central office switching apparatus may be intercepted from dead trunk levels or other intermediate points by modifying the apparatus to be described.

Before proceeding further with the operational description, it is pointed out that each intercept line circuit such as ILC20 is accessible in the arrangement shown in Fig. 1 to the finder part of each one of a plurality of substantially identical intercept link circuits such as link 1 shown in Figs. 3, 5 and 6. Each such link is effective for extending a connection from any one of the intercept line circuits to any idle one of a plurality of trunk lines such as TL70 outgoing to an operator position OP70. While in Fig. 1 only first and second intercept link circuits are shown, it is to be understood that an indefinite number of links may be provided as required to meet the traffic requirements of the system. In order to assign an idle one of the intercept link circuits, an intercept link allotter such as the one shown in Fig. 4*a* is provided. The allotter is common to all intercept line and intercept link circuits. It is effective upon the receipt of a call at any one of the intercept line circuits to energize the currently assigned one of the idle intercept link circuits in the manner next described.

An incoming call on one of the intercept line circuits is indicated by the operation of that circuit's line relay. Accordingly, the operation of the relay 200 in ILC20 is effective in the previously described manner for applying ground to the start conductor C201 through make contacts 201 and break contacts 211.

*Finding a seized intercept line circuit*

Assuming for the moment that link transfer 1 relay 400 within the intercept link allotter is in normal condition, start conductor C201 is connected to the link start relay 500 within intercept link 1 over the following circuit: from grounded conductor C201, through break contacts 401, MB30 and 312, and the winding of relay 500 to battery. Relay 500 thereupon operates to initiate the hunting operation of the link 1 switches.

Each intercept link circuit is provided with an incoming end including a finder and an outgoing end including a trunk selector. The finder and selector each have a rotary, non-homing type switch. The operation of the link start relay in one of the links is effective for initiating the hunting operation of the finder and switches within the same link in order to start the process of establishing connections (1) between the calling one of the intercept line circuits to the incoming end of that link, and (2) between the outgoing end of that link and an idle one of the trunk lines. The operation of the finder is next described.

In order to provide the previously mentioned access to the intercept link, each intercept link circuit is connected by conductors such as T, R, SS and H to an individual one of the terminal sets on each intercept link finder switch bank. Accordingly, these conductors are connected to finder switch wipers such as FT, FR, FS and FH, respectively, when the wiper set of the finder switch engages the terminal set of the individual intercept line circuit under consideration. Each intercept line circuit, such as ILC20, in its normal condition is arranged to apply ground to the corresponding one of its set of terminals engaged by wiper FH through break contacts 202. The presence of an incoming call on seized line circuit ILC20 is indicated to the link finder by the removal of ground from conductor H at break contacts 202 and the connection of conductor H to battery through the winding of cutoff relay 210 at make contacts 203 upon operation of line relay 200.

Assuming that the finder wiper set is in engagement with a terminal set for an intercept line circuit other than the one on which an incoming call is standing at the time that start relay 500 is operated, a circuit is completed from the grounded conductor H currently engaged by wiper FH for energizing stepping magnet FM30 of the finder switch. The circuit is traced from grounded conductor H through wiper FH, break contacts 314, make contacts 502, interrupter break contacts FMI30, and the winding of magnet FM30 to battery. The energization of magnet FM30 is effective for opening break contacts FMI30, thereby deenergizing the magnet. Thereafter, means (not shown) within the switch advances the wiper set into engagement with the next succeeding terminal set in the finder bank. In this manner the finder is advanced until the wiper set engages the terminal set of the intercept line circuit on which an incoming call is standing.

Upon the location of the calling one of the intercept line circuits by the finder, a test circuit including finder hunt relay 310 becomes effective for stopping the switch from further stepping operations. It is to be noted that the operation of relay 500 is effective for preparing an operating circuit for relay 310 from ground through make contacts 503, the winding of relay 310, make contacts 502, break contacts FMI30, and the winding of magnet FM30 to battery. However, ground applied over a part of the above described energizing circuit for magnet FM30 shorts out the winding of relay 310 over an obvious circuit during the time that wiper FH is connected to a grounded one of conductors H. However, upon the advance of the wiper set to the calling one of the intercept line circuits, the presence of battery on the contacted conductor H removes the short from around the winding of relay 310 and allows relay 310 to operate over its above traced operating circuit.

The operation of relay 310 is effective for completing an operating circuit for cutoff relay 210 of the calling one of intercept line circuits ILC20. The circuit is traced from ground through make contacts 503 and 315, wiper FH, conductor H, make contacts 203, and the winding of relay 210 to battery. The presence of ground from this source on conductor H is further effective for making the finder switch of other intercept links pass over the particular terminal set after the link 1 finder has seized the intercept line circuit. Relay 210 thereupon operates. The operation of relay 210 is effective for disconnecting ground from the above described start conductor C201 at break contacts 211 in order to open the above described energizing circuit for relay 500. The operation of relay 210 is further effective for applying ground to conductor SS through make contacts 201 and 212. The operation of relay 310 is further effective for partially completing an operating circuit for relay 510 at make contacts 316 and for opening the energizing circuit for magnet FM30 at break contacts 314.

The presence of ground on conductor SS while it is engaged by wiper FS is effective for completing an obvious operating circuit for hold relay 300 through make contacts 313. Relay 300 operates, and is effective for completing a locking circuit for relay 500 from ground through make contacts 201, 212, conductor SS, wiper FS, make contacts 301 and 311, and the winding of relay 500 to battery. Relays 300, 310 and 500 are thereafter maintained operated throughout the extension of a call to the intercept link.

At this point the finder has completed a connection from the talking channel terminals of the called intercepted lines (i. e., to which the line tip and ring conductors are connected) through the T and R conductors of intercept line circuit ILC20 to the talking channel of the incoming end of the intercept link.

*Selecting an idle trunk line*

Returning to the point in the description at which relay 500 is first operated, during the time that the intercept link finder is hunting for the calling intercept line circuit in the above described manner, the operation of relay 500 is effective for causing the intercept link selector to hunt for an idle one of a plurality of outgoing trunk lines extending to the operator position in order to complete a connection between the outgoing end of the intercept link and the selected one of the trunks. This operation of the selector takes place at the same time that the finder operation is proceeding, thereby reducing the time required for the link to complete its switching function.

Referring to Fig. 1, a group of trunk lines, such as TL70, extend from the office at which lines L20 and L21 are terminated to an operator position OP70. Each one of the trunks is terminated at the office in a circuit, such as OGT70. Each of the trunk lines and circuits is accessible through conductors such as T1, R1 and S1 to other switch equipment within the office, such as selector 70 shown in the block form in Fig. 7*a*. Selector 70 is effective in the well known manner for searching for and seizing an idle one of the trunks in order to extend a connection from the office to the operator position. Upon such seizure selection, means in trunk termination OGT70 is effective for marking that trunk line busy to other selectors similar to selector 70 and to the intercept links. To this end, means (not shown) within OGT70 is effective when TL70 is idle for connecting resistance battery to the sleeve conductor S1, and, upon seizure for closing contacts 731 in order to apply direct ground to conductor S1, thereby characterizing the particular trunk termination as busy.

The terminals within the set on which conductors T1, R1 and S1 are connected are engaged by the intercept link 1 selector switch wipers ST, SR and SS, respectively. Upon seizure of the intercept link, in order to prevent the trunk selector from repeatedly attempting to establish a connection over a defective trunk line, provision is made to advance the wiper set one step away from the terminal set engaged at the time of seizure, regardless of whether or not the first engaged set is in idle condition. To this end, the operation of relay 500 is effective for momentarily completing an energizing circuit for selector magnet SM70 from ground through break contacts 602, make contacts 501, and the winding of magnet SM70 to battery.

In addition to its previously described functions, relay 500 in operated condition is further effective for completing a circuit for operating shunt relay 600 from ground through make contacts 506 and the winding of relay 600 to battery. Because relay 600 is a slow operate type, the operation of relay 600 is delayed for a predetermined time interval following the operation of relay 500 and the energization of magnet SM70. After magnet SM70 has been energized in the above described manner, relay 600 operates to open the above traced circuit for energizing magnet SM70 at break contacts 602. Thereupon the wiper set of the selector switch is advanced into engagement with the next succeeding terminal set in the switch bank. Thereafter the selector hunts in the manner next described until an idle terminal set is engaged by the wiper set.

Assuming that the first test terminal set encountered by the wiper set is in busy condition (i. e., ground is connected through the terminal engaged by wiper SS), the operation of relay 600 is effective for completing a circuit for reenergizing magnet SM 70 in order to advance the wiper set into engagement with the next succeeding terminal set. The circuit is traced from wiper SS through break contacts 615, make contacts 601, break contacts 532 and interrupter break contacts SMI70, and the winding of magnet SM70 to battery. The energization of magnet SM70 is effective for opening interrupter contacts SMI70 in order to release magnet SM70 and whereupon means (not shown) within the selector switch advances the wiper set into engagement with the following terminal set. This operation may be repeated until an idle terminal set is engaged.

The operation of relay 600 is also effective for preparing a test circuit to be effective upon the location of an idle trunk terminal set in the selector bank. The test circuit is traced from ground through make contacts 603, the winding of selector hunt relay 610, make contacts 601, break contacts 532 and SMI70, and the winding of magnet SM70 to battery. When busy terminal sets are engaged by the wiper set, the application of ground to wiper SS closes an obvious circuit for shorting out the winding of relay 610. However, when an idle terminal set is encountered, and battery is applied to wiper SS, the above traced circuit passes enough current to cause relay 610 to operate.

Means including the contacts of relay 610 is effective upon the operation of that relay for stopping the selector switch wipers from advancing to the next succeeding terminal set. Thus the operation of relay 610 is effective for disconnecting magnet SM70 from wiper SS at break contacts 615 in order to prevent subsequent energization of magnet SM70.

The selector is effective upon the operation of relay 610 for extending a connection from the talking channel of the outgoing end of the intercept link through the wipers ST and SR of the selector switch to the talking conductors T1 and R1 of the selected trunk circuit and line. The operation of relay 610 is further effective to complete a direct current path between conductors T1 and R1 of the seized trunk which is traced from conductor T1 through wiper ST, make contacts 611, the windings of bridge impedance coil 540, make contacts 612, and wiper SR to conductor R1. The completion of the path between conductors T1 and R1 in the above described manner is effective for seizing the selected trunk OGT70 and applying ground by means not shown to conductor S1 at make contacts 731, thereby operating the sleeve relay 710 in OGT70 and marking the seized termination and trunk line busy to other equipment such as selector 70 and the other intercept links. The effect of relay 710 operation is to be explained presently.

The operation of relay 610 is further effective for establishing a locking circuit for itself from ground through make contacts 603, the winding of relay 610, make contacts 601 and 614, break contacts SM170, and the winding of magnet SM70 to battery. Thereafter, relay 610 is held operated throughout the duration of the call.

*Connecting the incoming and outgoing ends of the intercept link*

The operation of relay 610 in conjunction with the operation of relay 310 is further effective for completing the previously mentioned operating circuit for connect relay 510 from battery through resistor R50, make contacts 613 and 316, and the winding of relay 510 to ground. Thus it is seen that relay 510 operates after the finder has located the calling intercept line circuit and the selector has seized an idle outgoing trunk.

The operation of relay 510 is effective for temporarily connecting the incoming end of the intercept link to a ringing trip circuit in order to cause the previously mentioned ring trip switch-through means within CONN20 to disconnect the ringing apparatus from conductors T and R to complete a connection from the calling subscriber line station A to the incoming end of the link. This tripping operation is accomplished by momentarily connecting battery through resistors R51 and R52 to conductors T and R, respectively, through operated contacts at relay 510. In the case of conductor T, the connection is traced from battery through resistor R51, break contacts 521, make contacts 511, and wiper FT to conductor T. In the case of conductor R, the connection is traced from battery through resistor R52, break contacts 523, make contacts 512, and wiper FR to conductor R.

The operation of relay 510 is effective for completing an operating circuit for trip relay 520 from ground through make contacts 514, a delay device consisting of thermistor R53 (which has a negative temperature coefficient), and the winding of relay 520 to battery. The amount of current passed through the operating circuit upon its completion is insufficient to operate relay 520. However, after current has flowed through R53 for a predetermined length of time, the resistance of R53 drops to the point where current flowing in the winding of relay 520 operates relay 520. The operation of relay 520 is effective for closing a locking circuit for itself from ground through make contacts 514 and 525 and the winding of relay 520 to battery. The operation of relay 520 is effective for transferring the incoming end of the intercept link from its connection to the tripping resistors R51 and R52 at break contacts 521 and 523, respectively, into connection with the outgoing end of the link at make contacts 522 and 524. Thus it is seen that the operation of means including relay 510 is effective for completing a talking connection between the calling subscriber station and the selected outgoing trunk line to operator position OP70.

*Signaling operator position OP70*

Within OGT70, conventional apparatus (not shown) is effective in response to the completion of the previously described direct current bridge between conductors T1 and R1 for causing trunk line relay 720 at the operator position to be energized and operate in order to complete an obvious energizing circuit for incoming signal lamp LP70. Within the intercept link, the operation of relay 510 is effective for connecting a signal from an intercept tone source through capacitor C51, make contacts 513 and 613, wiper SS, and conductor S1 to apparatus (not shown) within OGT70 for coupling the intercept tone signal to conductors T1 and R1. This tone connection apprises the operator that the call being received at OP70 is of the intercept class. Thereafter the connection to the operator position through the intercept link is maintained until the calling station hangs up.

*Release of the intercept link*

At the conclusion of the call to the operator position, the calling telephone at station A is returned to its hookswitch, thereby releasing the switching apparatus including CONN20 within the office in the conventional manner. The release of CONN20 is effective for removing ground from incoming conductor S to intercept line circuit ILC20, thereby releasing relay 200. The release of relay 200 is effective for opening the previously described locking circuit for relay 500 and the operating circuit for relay 300 at make contacts 201. Both relays 500 and 300 therefore release. The release of relay 500 is effective for opening the previously described operating circuit for finder hunt relay 310 at make contacts 502. Relay 310 thereupon releases. The release of relay 310 is effective for opening the above described operating circuit for connect relay 510 at make contacts 316. Relay 510 thereupon releases.

The release of relay 510 is effective for disconnecting the incoming end of the intercept link from the outgoing end at make contacts 511 and 512. The release of relay 510 is further effective for opening the operating and holding circuits of relay 520 at make contacts 514, whereby relay 520 is released to restore the previously described ring trip apparatus within the intercept link. The release of relay 510 is effective for opening the previously described operating circuit for shunt relay 600 at make contacts 506, whereby relay 600 is released.

The release of relay 600 is effective for opening the previously described operating and locking circuits for selector hunt relay 610 at make contacts 603 and 601 and for restoring the previously described initial step-off circuit for energizing magnet SM70 at break contacts 602. The release of relay 610 is effective for opening the connection between the outgoing end of intercept link circuit 1 and the wipers of the selector switch at make contacts 611 and 612. The release of relay 610 is further effective for reconnecting the winding of relay 610 to selector switch wiper SS at break contacts 615.

The disconnection of the front portion of the intercept link from the selector switch wipers is effective for releasing outgoing trunk circuit OGT70 and trunk line TL70 by opening the previously described connection between conductors T1 and R1 at make contacts 611 and 612. Thus the apparatus in outgoing trunk OGT70 releases and removes the busy condition from OGT70 by opening make contacts 731 to remove ground from conductor S1. The release of OGT70 is effective for causing conventional apparatus (not shown) to bring in a disconnect signal at operator position 70. At this point all circuits are in their normal conditions and ready for further use.

*All trunks busy condition*

Thus far in the description it has been assumed that an idle trunk line is available to the trunk selector of intercept link 1. However, provision is made for preventing useless hunting of the intercept link selector in the event that all trunks are in busy condition. To this end, the sleeve relay of each outgoing trunk line, such as OGT70, is equipped with a pair of break contacts, such as 711, through which ground is connected to the all trunks busy conductor C700, conductor C700 being common to the trunk terminations. Within this arrangement, ground is present on conductor C700 as long as any one of the OGT70 trunk terminations is in idle condition.

Assuming that ground is present on C700 at the time that link start relay 500 is operated, the operation of relay 500 is effective for connecting grounded conductor C700 through break contacts on relay 617 and make contacts 505 to the lower winding of all trunks busy relay 530 and battery. At the same time the operation of relay 500 is effective to energize the upper winding of relay 530 from ground through make contacts 504, break contacts 616 and the upper winding of relay 530 to battery. These upper and lower windings are differentially energized so that the relay under these conditions is unoperated. However, in the event that ground is removed from conductor C700 as a result of all trunk ilnes becoming busy, the lower winding of relay 530 is deenergized, allowing relay 530 to operate on the basis of the current flowing through the upper winding only.

The operation of relay 530 is effective for opening the above described energizing circuit for magnet SM70 at break contacts 532 so that the selector switch is not advanced after taking its preliminary step. Similarly, the operation of relay 530 is effective for closing an alternate operating path for connect relay 510 which is traced from battery through resistor R50, make contacts 533 and 316, and the winding of relay 510 to ground. Relay 510 thereupon operates and is effective in the previously described manner to make resistors R51 and R52 effective, thereby operating the ring trip apparatus in CONN20. Thereafter, trip relay 520 operates in the previously described manner and is effective for connecting the incoming and outgoing ends of the intercept link to each other at make contacts 522 and 524. At this time the operation of relay 530 is effective for connecting busy tone through capacitor C50 and make contacts 531 to the talking circuit of the outgoing end of the intercept link and, therefore, to the calling line. The busy tone informs the subscriber at calling line station A that the attempt to complete the call has been unsuccessful and that his telephone should be returned to its hookswitch in order to release the equipment.

It is pointed out in connection with the description of all trunks busy relay 530 that in the normal course of extending a connection between the intercept link and an idle trunk line, both upper and lower windings of relay 530 are disconnected from their ground supplies upon the operation of selector hunt relay 610 at break contacts 616 and 617, so that the application of busy tone to the connection extended through the intercept link cannot be effected after the finding of an idle outgoing trunk.

*Allotting intercept links*

The foregoing description has been confined to the extension of a call through intercept link 1. However, in the event that link 1 is already in use at the time that a call is extended to the terminals of a line receiving intercept service, it becomes the function of the intercept link allotter, shown in skeletonized form in Fig. 4*a*, to allot the next succeeding one of the plurality of intercept links. Accordingly, link transfer 1 relay in Fig. 4*a* is normally unoperated prior to the taking of the first link for use. However, upon seizure of the link and the consequent operation of finder hunt relay 310, which takes place in the previously described manner, ground is applied to the upper winding of link transfer relay 400 from ground through break contacts MB32, make contacts 318, conductor LS, and the upper winding of relay 400 to battery. Relay 400 thereupon operates.

The operation of relay 400 is effective to transfer link start conductor C201 from its previously described connection to conductor C400 and link start relay 500 of link 1 to a connection with the corresponding conductor and relay winding in the next succeeding link (intercept link 2 in the specific embodiment shown here). The resulting operation of the link start relay in link 2 starts the operation of the finder and selector within link 2 in substantially the same manner as that described in connection with link 1.

After the seizure of link 1, but prior to the time that intercept link 2 is seized, ground is applied through break contacts on the unoperated finder hunt relay 410 within link 2 to the lower winding of relay 400 from ground through break contacts 411, make contacts 403, and the lower winding of relay 400 to battery. Relay 400 therefore remains in operated condition and maintains conductor C201 transferred into connection with the apparatus in link 2 so long as link 2 remains idle. Therefore, it is seen that the links are assigned to calls incoming to the intercept line circuits in rotation even though link 1 and other previously assigned links (not shown) have become idle. In the case chosen for illustration here, only first and second links are shown however. Therefore, upon the seizure of the intercept link 2, the intercept link allotter is restored to its normal condition, so that the rotational assignment or allotting of idle links may start from link 1 again.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a telephone system, an office, switching equipment for extending calls to apparatus terminated within said office, a plurality of trunk lines terminated at said office, a link having an incoming end including a finder and an outgoing end including a selector, said finder having a switch operative for extending a connection from said office terminated apparatus to said incoming link end, said selector having a switch operative for extending a connection from said outgoing link end to an idle one of said trunks, start means within said link operative in response to the extension of a call to said apparatus for rendering said finder and said selector switches simultaneously operative, and means thereafter operative for connecting said incoming and said outgoing link ends, whereby the time required for said finder and said selector switches to establish a connection between said office terminated apparatus and one of said trunk lines is reduced to a minimum.

2. In a telephone system, an office, a plurality of lines terminating at said office, switching equipment for extending connections from a calling to a called one of said lines, a plurality of trunk lines, a link having an incoming end including a finder and an outgoing end including a selector, said finder having a switch operative for extending a connection from a called one of said office terminated lines to said incoming link end, said selector having a switch operative for extending a connection from said outgoing link end to an idle one of said trunks, start means within said link operative in response to the extension of a call to any one of certain of said lines for rendering said finder and said selector switches simultaneously operative, and means thereafter operative for connecting said incoming and said outgoing link ends, whereby the time required for said finder and said selector to establish a connection between ones of said office terminated lines and said trunk lines is reduced to a minimum.

3. The system set forth in claim 2 and having in addition first means operative in response to the establishment of a connection between a calling one of said office terminated lines and said incoming link end and second means operative in response to the establishment of a connection between said outgoing link end and an idle one of said trunk lines, and wherein said link end connecting means is operative in response to the operation of both said first and said second means, whereby a connection between said incoming and said outgoing link ends is completed only when said finder has located the calling one of said lines and said selector has located an idle one of said trunk lines.

4. The system set forth in claim 3 and having in addition all trunks busy means in said link for preventing said selector switch from operating and means common to said trunk lines operative in response to a busy condition on all of said trunk lines and to the operation of said start means for operating said all trunks busy means, whereby said selector is prevented from operating when all said trunk lines are busy.

5. The system set forth in claim 4 and having in addition a busy tone source and wherein said all trunks busy means is effective for operating said link end connecting means and for connecting said tone source to said outgoing link end, whereby said tone source is also connected to the calling one of said office terminated lines when all said trunks are busy.

6. The system set forth in claim 5 wherein said second means in operated condition is further effective for making said all trunks busy means inoperative, whereby coupling between said tone source and the calling one of said lines is prevented after said selector has located an idle one of said trunk lines.

7. In a telephone system, an office, a plurality of lines terminated at said office, switching equipment for extending a connection from a calling to a called one of said lines, auxiliary line circuits individually connected to those of said lines on which incoming calls are to be intercepted, an intercept link having an incoming end and an outgoing end, said incoming end including a finder comprising a first switch for extending a connection from any one of said auxiliary line circuits and the one of said lines connected thereto to said incoming link end, a plurality of trunk lines extending to an operator position, said outgoing link end including a selector comprising a second switch for extending a connection from said outgoing end to any idle one of said trunk lines, start means in said link operative in response to the extension of a connection to any one of said auxiliary line circuits for rendering said finder and said selector simultaneously operative, finder stop means in said link operative in response to the location of the calling one of said auxiliary line circuits by said finder switch for preventing further operation of said finder switch, selector stop means in said link operative in response to the location of an idle one of said trunk lines by said selector for preventing further operation of said selector switch, and connecting means operative in response to the operation of both said finder stop means and said selector stop means for connecting said incoming link end to said outgoing link end, whereby a calling one of said auxiliary line circuits and the one of said office terminated lines connected thereto may be connected to an idle one of said trunks in the minimum time required for both said switches to operate.

8. The system set forth in claim 7 and having in addition a tone source, all trunks busy means within said link for preventing said selector from operating, for operating said link end connecting means, and for connecting said tone source to said outgoing link end, and means common to said trunk lines effective upon the presence of a busy condition on all said trunk lines and to the operation of said start means for operating said all trunks busy means.

9. In a telephone system comprising a first line, a plurality of trunk lines, a link including a selector having access to each of said trunk lines, and means for extending a connection from said first line to said link, the combination comprising: means operative in response to the operation of said connection extending means for starting the operation of said selector in order to locate an idle one of said trunks, means comprising a relay having first and second windings operative for preventing the operation of said selector, said starting means being effective for energizing said first relay winding, means operative in response to the operation of said starting means for differentially energizing said second relay winding in order to prevent the operation of said relay during the time that said selector is operated, and means effective in response to a busy condition on all said trunk lines for rendering said second winding energizing means ineffective, whereby the operation of said selector is prevented when all said trunks are busy.

10. The system set forth in claim 9 wherein said link also has an incoming end to which said first line is extended upon the operation of said connection extending means, an outgoing end including said selector, and means operative in response to the location of an idle one of said trunk lines by said selector for connecting said incoming link end to said outgoing link end, and wherein the operation of said connecting means is effective for rendering said start means inoperative, whereby control of the operation of said all trunks busy means after the selection of an idle one of said trunks is removed from said start means.

11. The system set forth in claim 10 and having in addition a tone source and wherein said all trunks busy means is effective for operating said connecting means and for connecting said tone source to said outgoing link end, whereby said tone source is connected to said first line when all said trunk lines are busy.

References Cited in the file of this patent

UNITED STATES PATENTS

| | | |
|---|---|---|
| 1,861,754 | Powell | June 7, 1932 |
| 2,609,456 | Hall | Sept. 2, 1952 |